(No Model.) 2 Sheets—Sheet 1.
J. A. McPHERSON.
CORN OR COTTON PLANTER AND FERTILIZER DISTRIBUTER.
No. 466,181. Patented Dec. 29, 1891.
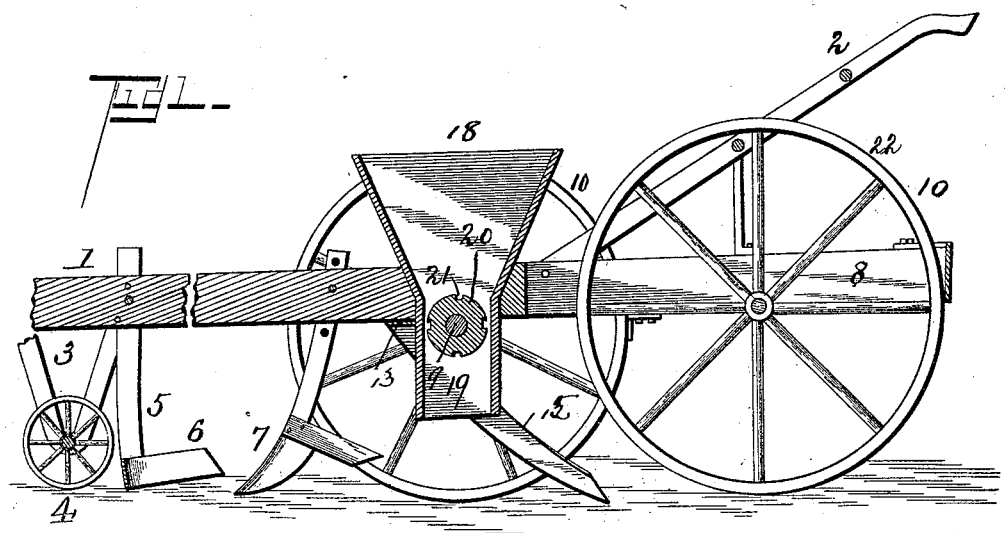
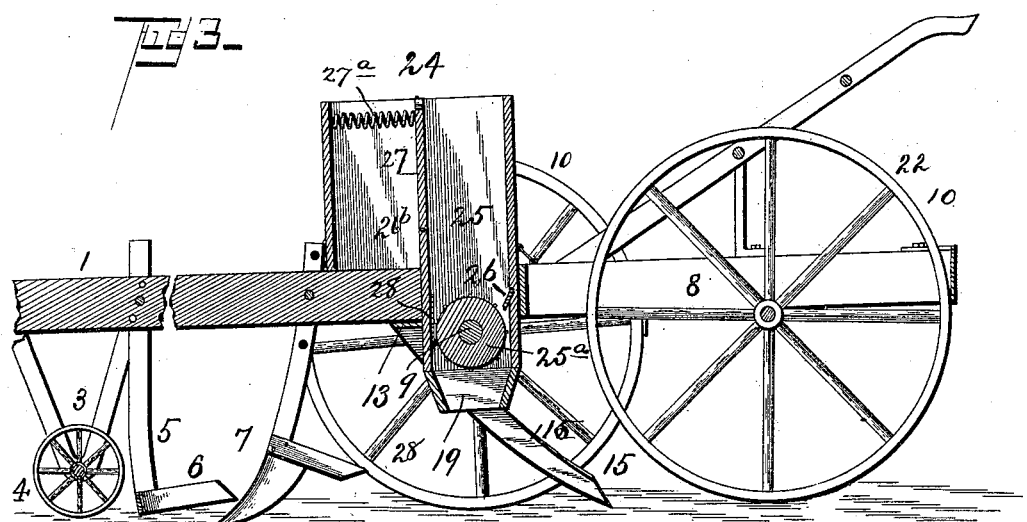
WITNESSES:
F. L. Durand
W. L. Coombs
INVENTOR:
James A. McPherson,
by Sure Gagger & Co.,
Attorneys.

(No Model.) 2 Sheets—Sheet 2.
J. A. McPHERSON.
CORN OR COTTON PLANTER AND FERTILIZER DISTRIBUTER.
No. 466,181. Patented Dec. 29, 1891.
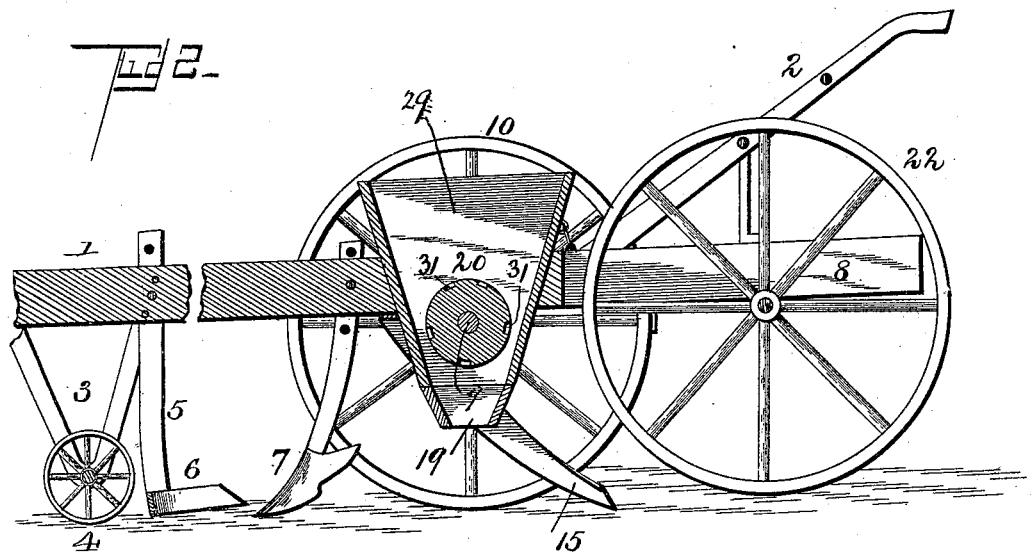
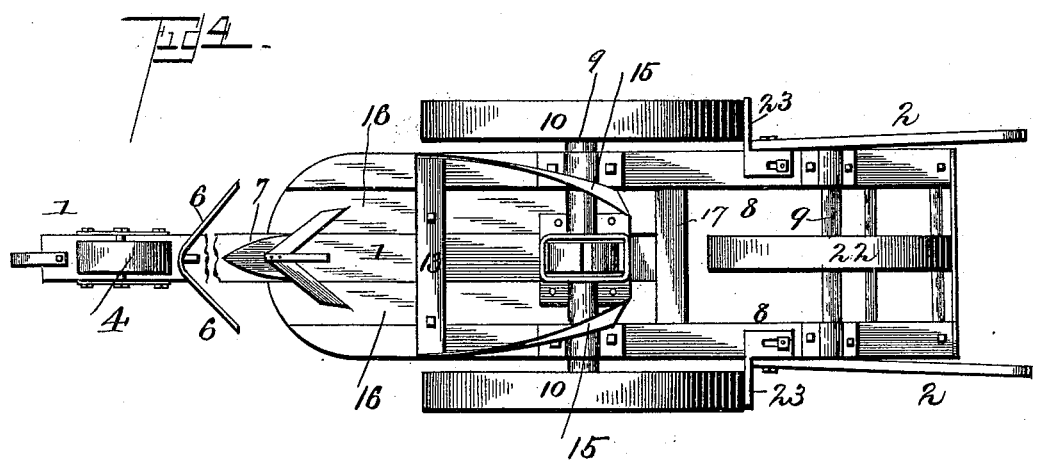
WITNESSES:
F. L. Ourand
W. L. Coombs
INVENTOR:
James A. McPherson,
by Sures Dagger & Co.
Attorneys

UNITED STATES PATENT OFFICE.

JAMES A. McPHERSON, OF SOUTH MILLS, NORTH CAROLINA.

CORN OR COTTON PLANTER AND FERTILIZER-DISTRIBUTER.

SPECIFICATION forming part of Letters Patent No. 466,181, dated December 29, 1891.

Application filed April 22, 1891. Serial No. 389,955. (No model.)

*To all whom it may concern:*

Be it known that I, JAMES A. MCPHERSON, a citizen of the United States, and a resident of South Mills, in the county of Camden and State of North Carolina, have invented certain new and useful Improvements in Corn or Cotton Planters and Fertilizer-Distributers; and I do hereby declare that the following is a full, clear, and exact description of the invention, which will enable others skilled in the art to which it appertains to make and use the same, reference being had to the accompanying drawings, which form a part of this specification.

My invention relates to improvements in corn and cotton planters and fertilizer-distributers.

As is well known, machines or implements for planting corn are not adapted for planting cotton nor for distributing fertilizing material, thus rendering it necessary to employ three different machines for the above purposes, it being impracticable to combine in one machine devices capable of performing all of said functions, owing to the structural differences between said devices.

The object of the invention is to provide an implement in which the hopper and feeding boxes are movable and interchangeble, so that one and the same machine may be employed for planting corn or cotton and fertilizing material by simply changing the feeding devices.

In the accompanying drawings, Figure 1 is a sectional view of an implement constructed in accordance with my invention adapted for use as corn-planter. Fig. 2 is a similar view, the corn-feeding device being removed and cotton-planting devices substituted therefor. Fig. 3 is a similar view, the implement being adapted for distributing fertilizing material. Fig. 4 is a bottom view of the construction shown in Fig. 1.

In the said drawings, the reference-numeral 1 designates the beam to which the draft-animals are attached, and 2 the handles. These are constructed in any ordinary or suitable manner.

To the lower side of the forward end of the beam are secured downwardly-depending brackets 3, in which is journaled the guide-wheel 4, and in rear of said wheel is a clod-remover consisting of a downwardly-extending bar 5, having at its lower end a curved transverse arm or arms 6. This clod-remover serves to throw aside large clods or other objects which might interfere with the planting devices.

Near the rear end of the beam is a vertically-adjustable plowshare 7, which forms the furrow to receive the seed, and to the rear end of this beam are secured the side pieces 8, to which the handles are secured and to which the axle 9, carrying the wheels 10, is journaled. On the under side of these side pieces is secured a covering-arm, which consists of the transverse portion 13 and the horizontal curved arms 15, which extend back of the feeding-boot and serve to cover the seed after being deposited.

Intermediate of the side pieces 8 and the beam are blocks 16, which, in connection with the transverse bar 17, serve to retain the hopper 18 in place.

The corn-hopper consists of four inclined walls having a rectangular opening in the bottom, just underneath of which and communicating therewith is a feeding-boot 19. Through this hopper the axle 9 passes, and located therein and fixed to the axle is a feeding-wheel 20, having a number of transverse peripheral grooves 21.

In the rear of the side pieces 8 is a guide-wheel 22, and just behind the wheels 10 on each side are scrapers 23, secured to and projecting from the said side pieces. These scrapers serve to clean the wheels of any dirt which might otherwise accumulate on the peripheries thereof.

The numeral 24 designates the cotton-hopper, consisting of a rectangular box with a downward extension 25 at its rear, in which is located the feeding-cylinder 25$^a$, having a number of peripheral projections 26. The boot 19 is secured to this extension, and the rear wall of said extension is provided with a leather strip at its lower end. The front wall of the extension 25 consists of a plate 27, pivoted in the hopper at 26$^b$ and provided with a spring 27$^a$, which keeps its lower end pressed up close to the feeding-cylinder, but which is capable of being forced outwardly by the seed passing between said end and the feeding-cylinder. At its lower end this wall is provided with a comb 28. The guano-hopper 29 is similar to the corn-hopper, but the feeding-cylinder is somewhat different, having a number of depressions or recesses 31 instead of transverse grooves.

The operation will be readily understood. Fig. 1 of the drawings represents the device employed as a corn-planter. To convert the same into a cotton-planter, it is only necessary to remove the hopper and feeding cylinders and substitute therefor the cotton or fertilizer hopper and cylinder, thus enabling one machine to perform three different functions with but little trouble.

Having thus described my invention, what I claim is—

The combination, with the beam, the side pieces, and the handle, of the removable cotton-hopper having the walls provided with flexible strips at their lower edges, the spring-actuated pivoted front wall, the comb secured thereto, and the axle having secured thereon the feeding-cylinder provided with peripheral projections, substantially as described.

In testimony that I claim the foregoing as my own I have hereunto affixed my signature in presence of two witnesses.

JAMES A. McPHERSON.

Witnesses:
WILLIAM E. McCOY,
GRANDY D. SAWYER.